United States Patent [19]

Urban et al.

[11] 3,768,872

[45] Oct. 30, 1973

[54] SKID CONTROL SYSTEM
[75] Inventors: John A. Urban, Livonia; Joseph H. McNinch, Jr., Oak Park, both of Mich.
[73] Assignee: Eaton, Yale & Towne, Inc., Cleveland, Ohio
[22] Filed: Mar. 17, 1971
[21] Appl. No.: 125,291

[52] U.S. Cl..................... 303/21 BE, 303/7, 303/20
[51] Int. Cl.............................................. B60t 8/10
[58] Field of Search ................... 188/181; 303/7, 9, 303/13, 20, 21; 324/160–162; 340/262–263

[56] References Cited
UNITED STATES PATENTS
3,583,773 6/1971 Steinbrenner et al. ......... 303/21 EB
3,260,555 7/1966 Packer........................... 303/21 EB
FOREIGN PATENTS OR APPLICATIONS
1,953,253 6/1970 Germany........................... 303/21 P

*Primary Examiner*—Milton Buchler
*Assistant Examiner*—Stephen G. Kunin
*Attorney*—Yount & Tarolli, Weinshenker & Cooper

[57] ABSTRACT

A compound anti-skid logic system in which a plurality of different logic circuits are operative in parallel to process input signals from a common source in accordance with the different logic of each circuit with the different circuits complementing each other so that at least one logic circuit detects a wheel lock or an impending wheel lock under widely variable road conditions and brake application pressures. The compound system is incorporated in a master module with additional slave modules used with the master module to control axles in addition to the axle controlled by the master module.

6 Claims, 4 Drawing Figures

INVENTOR
JOSEPH H. McNINCH, JR
JOHN A. URBAN
BY Yount and Tarolli
ATTORNEYS

SKID CONTROL SYSTEM

This invention relates to a skid control system for use in controlling the brake pressure applied to the fluid pressure operated brakes of a vehicle and, more particularly, to a skid control compound logic system for use in an air operated truck brake system.

Although the invention will be described with particular reference to an air brake system for truck tractors and trailers, it will be appreciated that the principles of the invention have broader application and may be used with other types of vehicles and in brake systems other than pneumatically actuated brake systems.

BACKGROUND OF THE INVENTION

It has long been recognized that vehicle wheel lock-up during braking produces several undesirable results among which are the increased stopping distance required to halt the vehicle, increased tire wear and loss of operator control over the direction of travel of the vehicle. To prevent the occurrence of results such as these, a wide variety of anti-skid systems have been developed for detecting wheel lock-up or impending wheel lock-up. Most, if not all, of these systems contemplate normal operator control of brake application until a locked or impending locked wheel is detected by the system and, thereafter, the system automatically operates to control braking of the vehicle until the condition which triggered the system is removed. However, as a practical matter, the prior art systems have proven less than satisfactory due to, among other reasons, the numerous variable factors which must be taken into consideration for any one system to perform satisfactorily under all possible conditions. Among these factors are the construction of the brake system, the inertia of the wheel and drive train assembly, the variable road conditions encountered, the frictional aspects of the tires, the static axle loading and the effect of weight transfers during braking.

In addition, it is highly desirable that the skid control system be sufficiently sensitive to detect impending wheel locks so that actual lock-up of the wheel can be avoided. On the other hand, nuisance actuation of the system due to normal braking and turning of the vehicle and different rolling radii of the tires must be avoided.

Another important consideration is that the integrity of the output signal from such systems should be maintained irrespective of the magnitude of the excess brake pressure applied to the brakes during a skid condition. In other words, a skid signal should be generated by the system under conditions which may range from a very small excess brake application to a very large excess brake application such as, for example, where there is a panic stop on icy roads. It is to be understood that "excess" brake pressure is always present when a skid condition occurs and it is the magnitude of the brake pressure in excess of the ideal brake pressure to which reference is made. The magnitude of this excess brake application pressure materially affects the operation of many skid control systems. For example, where the excess brake application is very small, a slow lock may occur in which a wheel slowly decelerates to a lock-up condition without a skid control signal being produced. Some skid control systems may allow the vehicle wheels to prematurely step down to zero speed; this step-lock, as it is called, may be occasioned in some systems during small excess brake application pressure and in others during large excess brake application pressures. In other systems, a heavy excess brake application will result in a fast-lock of the wheels before the brake pressure can be relieved resulting in loss of the skid control signal.

SUMMARY OF THE INVENTION

It is a primary object of this invention to provide an improved anti-skid control system which is operative to detect a wheel lock or an impending wheel lock and generate a skid signal under virtually all operating conditions.

It is a more specific object of the invention to provide a compound anti-skid logic system in which a plurality of different logic circuits are operative in parallel to process input signals from a common source in accordance with the different logic of each circuit with the different circuits complementing each other so that at least one logic circuit detects a wheel lock or an impending wheel lock under widely variable road conditions and brake application pressure levels.

A further object of the invention is to provide a compound anti-skid logic system which includes wheel speed logic, wheel and axle deceleration logic and computed wheel speed logic and which are all operative to produce a skid control signal for automatically varying the brake application pressure.

Still another object of the invention is to provide a skid control system which readily lends itself to a modular system of packaging and in which a master module together with add-on slave modules may be utilized to provide skid control for multiple axle vehicles such as tractor-trailer units or the like.

In accordance with the preferred form of the invention, the skid control system comprises a master logic module which controls the brake application pressure supplied to the two wheels on an axle with the module including logic circuit means for producing a skid signal when the deceleration of either wheel exceeds a predetermined threshold value and combination logic circuit means for producing a skid signal either when the actual velocity of either wheel is less by a predetermined amount than the velocity of the fastest rotating wheel of the vehicle or when the velocity of either wheel is less by a predetermined amount than the computed velocity of the wheel under predetermined assumed conditions.

In accordance with a further aspect of the invention it is contemplated that the skid control system may be used in a two axle vehicle with the master module being associated with, for example, the front axle of the vehicle and slave modules for controlling the brakes associated with the wheels on the other axle. The slave module receives two speed signals representative of the speeds of the two wheels with which that module is associated. These two speed signals are summed and applied to a first logic circuit means for generating a skid signal when the axle speed decreases at a rate in excess of a predetermined maximum rate. The slave module further includes a combination logic circuit which functions in the same manner as the combination logic circuit of the master module.

This basic skid control system utilizing a master and a slave module may be expanded by additional slave modules for each axle of the vehicle whereby a vehicle having almost any combination of axles can be controlled.

Other objects, features and advantages of the invention will be more apparent from the following description which, together with the attached drawings, discloses a preferred form of the invention.

BRIEF DESCRIPTION OF THE INVENTION

Referring now to the drawings wherein like reference numerals indicate like parts in the various views.

DESCRIPTION OF THE PREFERRED EMBODIMENT

Figure 1:
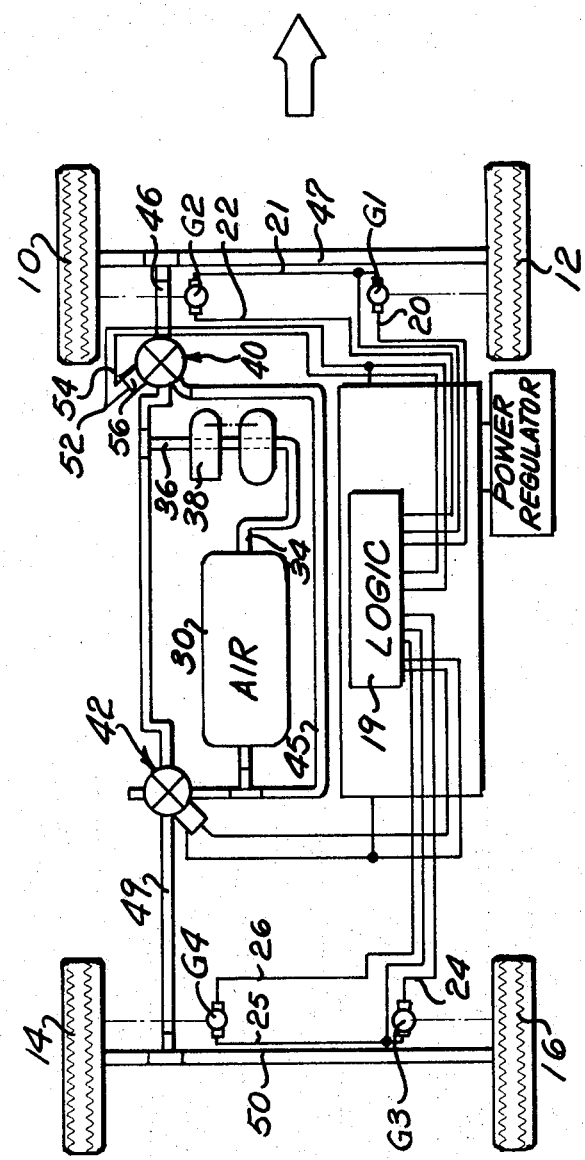
FIG. 1 is a schematic illustration of a skid control system constructed in accordance with this invention incorporated in a two axle vehicle.

Referring now more in detail to the drawings, there is schematically illustrated in FIG. 1 a truck tractor having front steer wheels 10,12 carried on a front axis or axle, and rear drive wheels 14,16 carried on a rear axis or axle. The wheels 10, 12, 14 and 16 are equipped with air brakes (not shown) which may be of conventional construction. Associated with the wheels are generators G1, G2, G3 and G4 of known construction which are driven in any conventional manner in response to rotation of their respective wheels to produce electrical signals proportional to the respective rotational wheel speed. The speed signals produced by the generators G1 and G2 are applied to a compound logic system 19 via conductors 20, 21 and 22, while the speed signals of generators of G3 and G4 are fed to the compound logic system 19 via conductors 24, 25 and 26.

The air brake system associated with the vehicle includes a high pressure air reservoir 30 connected by a conduit 34 with a conventional treadle valve 32 which is operable by an operator controlled treadle 38 to supply air pressure to a control conduit 36. The conduit 36 is in fluid communication with a pair of compensating relay valves 40,42. The valves 40,42 function as relay valves during normal brake operation and, when a skid condition is encountered, as compensating skid control valves which complement the skid control provided by the logic system 19. In the relay mode of operation, the valves 40 and 42 regulate the magnitude of air pressure supplied to the brakes in proportion to the magnitude of deflection of treadle 38. The brake pressure for the front wheels 10,12 is supplied from the reservoir 30 via conduits 44, 45 valve 40 and conduits 46,47. The brake pressure applied to the brakes of wheels 14 and 16 is supplied via conduits 44, 48 valve 42, and conduits 49 and 50.

If during braking a wheel-lock condition is detected, a skid signal is generated and applied to the appropriate valve 40 or 42, which will thereafter automatically control the applied brake pressure. For example, if the logic system 19 detects an incipient wheel-lock condition related to left front wheel 10 and/or to right front wheel 12, a skid signal is generated which is applied via conductors 52,54 to energize a solenoid 56 associated with valve 40. When thus actuated, valve 40 functions to block the flow of air to the brakes of wheels 12 and 14 and vents the air in the system to atmosphere. When the skid condition has been relieved, the solenoid 56 is de-energized and brake pressure is reapplied by the valve first at a rapid rate and then at a slower rate. For a detailed description of the compensating valve, reference may be had to copending application Ser. No. 125,280, filed Mar. 17, 1971, now abandoned, and to the related applications therefrom, to wit Continuation application Ser. No. 271,824, filed July 14, 1972 and Continuation-In-Part application Ser. No. 293,868, filed Oct. 2, 1972. All applications are assigned to the present assignee.

Figure 2:
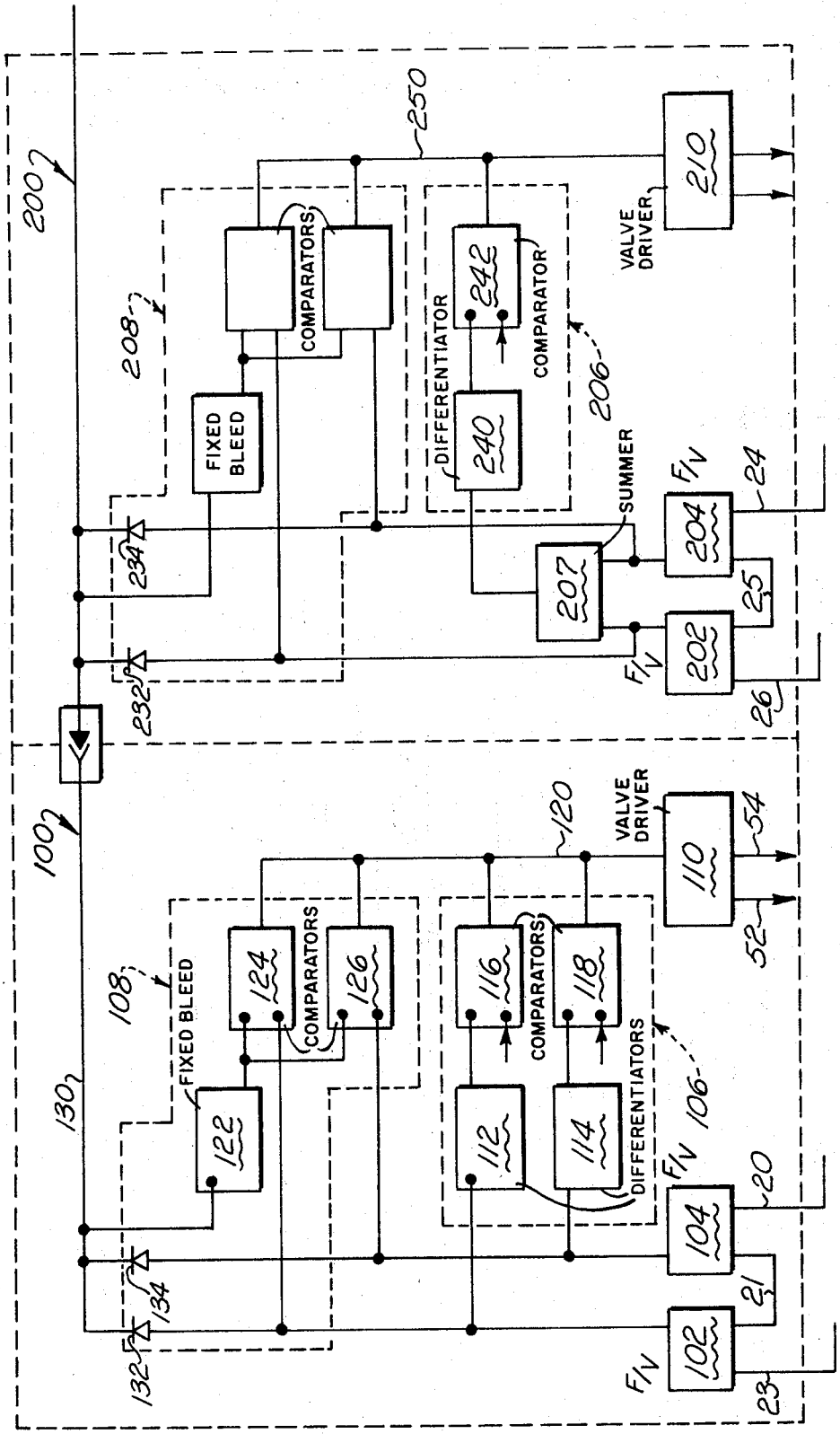
FIG. 2 illustrates in block diagram form one embodiment of the skid control system having a master module and a slave module.

Referring now to FIG. 2, one embodiment of a compound logic system 19 for a two-axle vehicle is shown in block diagram form. In this embodiment, the compound logic system 19 comprises a master logic module 100 associated primarily with the vehicle front wheels 10,12 and a slave logic module 200 associated primarily with the rear wheels 14,16. The master logic module 100 comprises a pair of frequency-to-voltage converters 102,104, a wheel deceleration logic circuit 106 for determining the deceleration of front wheels 10,12 and comparing the deceleration with a reference, a combination logic circuit 108 for comparing instantaneous wheel speed both with a computed speed based on an assumed predetermined rate of deceleration of the wheel and with the speed of the fastest wheel and a valve driver 110. When a skid signal is generated by any one of the logic circuits, the signal is impressed on the valve dirver 110 which energizes solenoid 56 via wires 52,54.

The slave logic module 200 comprises a pair of linear frequency-to-voltage converters 202,204, a combination logic circuit 208 (identical to logic circuit 108), a summing amplifier 207, an axle deceleration logic circuit 206 for the rear axle, and a valve driver 210 for energizing the solenoids of valve 42. Although the slave module is shown as being connected to the master module by conductor 130, it is to be understood that the modules need not be interconnected, in which event, the fastest wheel signal would, for each module, be the fastest wheel on the axle associated with that module.

While the compound logic system 19 has been illustrated as controlling a vehicle having two axles, this same system may be adapted to control vehicles having any number of axles simply by adding one slave logic module for each additional axle.

Considering now in more detail the master logic module 100 and particularly the wheel deceleration logic circuit 106, this logic functions to detect excessive wheel decelerations, which, if nor corrected, would lead to a wheel lock-up. This logic has the ability to provide an early indication of an impending wheel lock. The circuit comprises two differentiators 112,114 and two comparators 116,118. The differentiator 112 receives a signal from the converter 102 while the differentiator 114 receives its signal from the converter 104. The two differeneiators differentiate their respective input speed signals with respect to time to produce a signal which is representative of the deceleration of the associated wheel. The deceleration signals generated are compared in comparators 116,118 with a reference signal. If either comparison indicates a skid condition, a skid signal is generated and applied to the output line 120.

The combination logic circuit 108 comprises a fixed bleed circuit 122, two comparators 124,126 and diodes 132,134. The fixed bleed circuit 122 is connected to a conductor 130 and receives from that conductor a signal which is representative of the speed of the fastest rotating wheel of the vehicle. This is so since the outputs of each of the converters 102, 104, 202 and 204 are connected in parallel to the conductor 130 by blocking diodes 132, 134, 232, 234. In this manner, the wheel speed signal on conductor 130 is always representative of the speed of the fastest wheel. Comparator 124 is connected to the output of the fixed bleed circuit 122 and to the output of converter 102. Comparator 126 is connected to the fixed bleed output and to the output of the converter 104.

The fixed bleed circuit stores the input signal from conductor 130 and produces an output signal proportional to a percentage of that signal as long as the input signal is increasing, constant or decreasing at a rate not greater than a predetermined rate. However, if the input signal decreases at a rate greater than the predetermined rate, the output of the fixed bleed circuit will decrease at a rate which maintains the output signal at a value which is a percentage of what the average speed signal should be based on a predetermined assumed deceleration.

In one mode of operation the logic circuit 108 functions as a wheel speed logic circuit which compares the wheels 10,12 with the fastest rotating wheel. In another mode, logic circuit 108 functions as a computed speed change logic circuit. More particularly, if at least one wheel is decelerating at a rate less than the predetermined rate of the fixed bleed circuit 122, the output signal from the fixed bleed circuit is proportional to the input signal and the comparisons made by comparators 124,126 are direct wheel speed comparisons. Specifically, comparators 124,126 are functional, in this mode, to compare wheels 10,12 with the fastest vehicle wheel. On the other hand, if all of the vehicle wheels are decelerating at a rate in excess of the predetermined rate of fixed bleed circuit 122, the output from this circuit is artificially maintained at a value that decreases slower than the actual wheel speeds and comparators 124,126 are functional to compare the velocity of wheels 10,12 with this artificial or computed speed signal.

Figure 3:
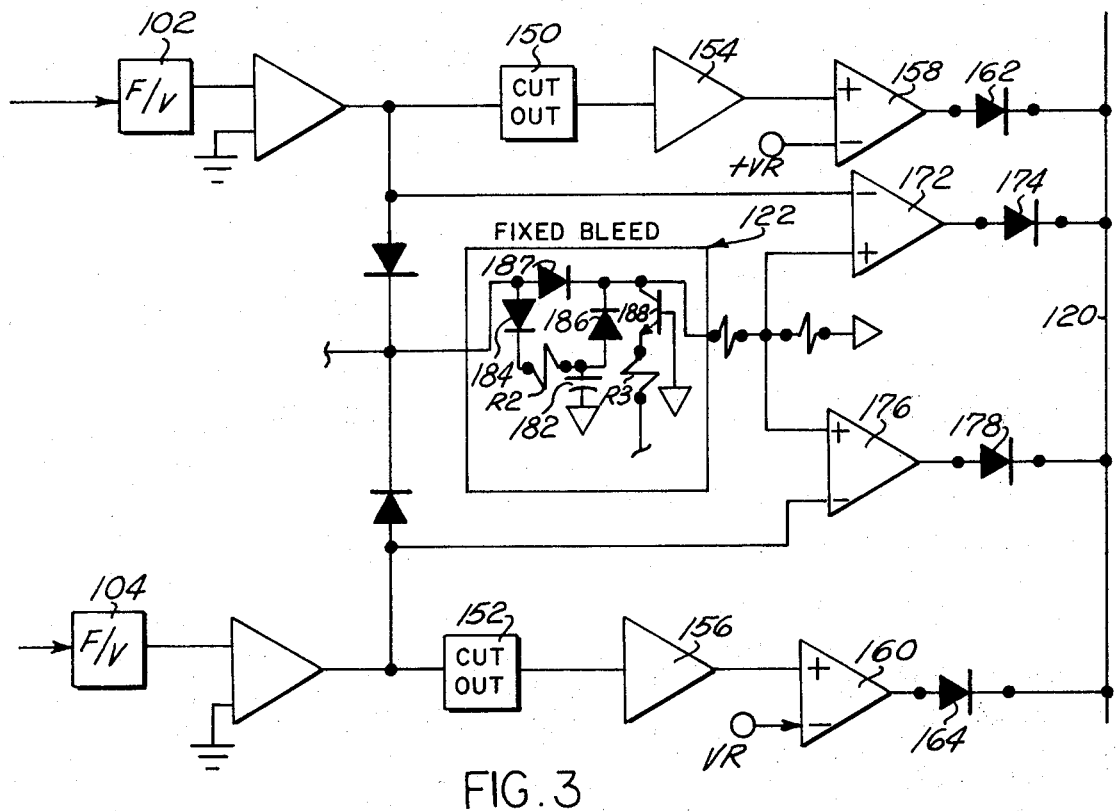
FIG. 3 is a schematic amplifier circuit for the master module of FIG. 2.

FIG. 3 illustrates an amplifier circuit which may be used for the master module 100. The wheel deceleration logic circuit 106 is embodied in the amplifier circuit of FIG. 3 and includes low speed cut-out devices 150,152 which render the wheel deceleration function inoperative if the input signals are below a certain predetermined level, such as 5 mph or less. Signals representative of speeds greater chan 5 mph pass through the cut-outs 150,152 to a pair of differentiators 154,156 which differentiate the input speed signals with respect to time to produce a deceleration signal with the signal from the amplifier 154 being indicative of the deceleration of the left wheel 10 and the signal produced by the amplifier 156 being indicative of the deceleration of the right wheel 12. The signals from the differentiators 154,156 are applied to comparator amplifiers 158,160 respectively. A reference voltage VR is applied to the amplifiers 158,160 with the applied reference voltage representing a threshold value which must be exceeded at any given vehicle speed before a skid signal will be generated. This threshold value is normally selected to be greater than the vehicle deceleration obtainable on a high coefficient surface. The deceleration signal fed to the comparator amplifier 158 results in an output voltage which is proportional to the difference of the input voltages. If the comparator voltage is negative, it is blocked by the diode 162 but, if positive, the voltage passes through the diode to the output line 120. The comparator amplifier 160 operates in precisely the same manner as amplifier 158.

A threshold value of 1 $g$ represented by the reference voltage VR has been found to provide adequate warning of incipient wheel lock conditions and adequate time to initiate corrective action before an actual wheel lock occurs. However, the threshold value may be greater or less than 1 $g$ depending on the type of brake system and vehicle use. Moreover, the threshold value varies with respect to the speed of the vehicle so that suitable means should be employed to vary the reference voltage VR as a function of vehicle speed.

Referring now to the combination logic circuit 108 which is embodied in the circuit of FIG. 3, the output signal from the converter 102 is directed to one terminal of a comparator amplifier 166 while the signal from converter 104 is directed to one terminal of comparator amplifier 168. The other terminals of amplifiers 166,168 are connected to the output of the fixed bleed circuit 122. A suitable fixed bleed circuit 122 is shown in FIG. 3. As shown, the speed signal from the fastest wheel is fed to capacitor 182 via diode 184 and R2. At constant speed or during acceleration, capacitor 182 is prevented from discharging since diode 186 is reverse biased. Upon wheel deceleration, diode 186 is forward biased, diodes 184 and 187 are reverse biased and the capacitor discharges through diode 186 and a constant current source 188. The rate of discharge is controlled by R3 and is chosen to correspond to a predetermined deceleration.

In the absence of the input signal decreasing at a rate greater than a predetermined rate, the fixed bleed circuit 122 will produce an output signal which is a predetermined percentage of the input signal. As a specific example, the fixed bleed circuit may be designed to produce an output signal which is 80 percent of its input signal so long as the input signal is increasing, constant or decreasing at a rate not greater than a rate corresponding to a 0.9 $g$ deceleration (0.9 $g$ being the potential limit for a heavy duty truck). However, if the input signal decreases at a rate greater than a 0.9 $g$ deceleration the circuit will maintain the output signal at a value representative of 80 percent of what the wheel speed signal should be based on a 0.9 $g$ deceleration. Accordingly, when at least one wheel is not decelerating in excess of 0.9 $g$, the combination logic circuit 122 functions as a wheel speed logic circuit which compares each wheel with the fastest rotating wheel. For example and assuming that the rear axle, right wheel is the fastest rotating wheel at some instant during the braking cycle, the signal on conductor 130 will be representative of the speed of that wheel. Assuming that the signal is not decreasing at a rate greater than 0.9 $g$, the output of the fixed bleed circuit 122 will be 80 percent of the input. If the signal received by the comparator amplifier 172 from the converter 102 is less than the signal produced by the fixed bleed circuit 182, the comparator amplifier 172 will produce an output voltage on the output line 120. The comparator amplifier 176 functions in precisely the same manner.

Thus, the combination logic circuit 180 provides a wheel speed comparison and, specifically, a comparison between the fastest vehicle wheel and the front wheels.

This same logic system 180 also functions as a computed speed change logic circuit when all wheels are decelerating at a rate in excess of 0.9 g. In this mode of operation, the output of the fixed bleed circuit will decrease at a 0.9 g rate based on 80 percent of the wheel speed signal on conductor 130 when the circuit is actuated. Therefore, when all of the wheel speeds are decelerating in an amount in excess of 0.9 g, the fixed bleed circuit 122 output is artificially maintained at a value that decreases slower than the actual wheel speeds. If wheel deceleration continues in this manner, the signals from converters 102 and 104 will, at some point in time, become less than the signal produced by the fixed bleed circuit and either one or both of the comparator amplifiers 172,176 will produce an output voltage which is impressed on the valve driver 114.

It should be noted that each of the described skid control logic circuits is ineffective under certain braking conditions to produce a skid signal. However, it has been discovered that under virtually all braking conditions at least one of the logic circuits will be operative to produce a skid signal of the required integrity. Thus, by incorporating the individual logic circuits into a compound system with the individual circuits operating independently and in parallel, skid control is provided for the vehicle irrespective of the conditions encountered.

The following chart summarizes in tabular form the quality of the skid control signal generated by each of the individual logic circuits under various conditions of excess brake application. The portions enclosed in a solid box indicate an unacceptable signal, the portion enclosed in a dashed box represents an acceptable signal and the unboxed portions represent a desirable, high quality signal.

early in the brake cycle (2) maintains a skid signal as long as the wheel speeds (or the axle speeds) differ by an amount in excess of a predetermined threshold value, nd (3) maintains a skid signal long enough to insure brake release in the event that all wheels lock before the brake pressure has exhausted sufficiently to permit wheel roll-up.

Turning now to the slave module 200 and the axle deceleration logic circuit 206, the summed signal from the amplifier 207 is directed to a differentiator 240 which differentiates the input speed signal with respect to time to produce a deceleration signal which is representative of the deceleration of the axle. This deceleration signal is then compared in a comparator 242 to a reference signal. If the comparison indicates a skid condition, a skid signal is generated on the output line 250.

The combination logic circuit 208 is identical in structure and functions to circuit 108 of the master module and further description of that circuit is believed unnecessary.

Figure 4:
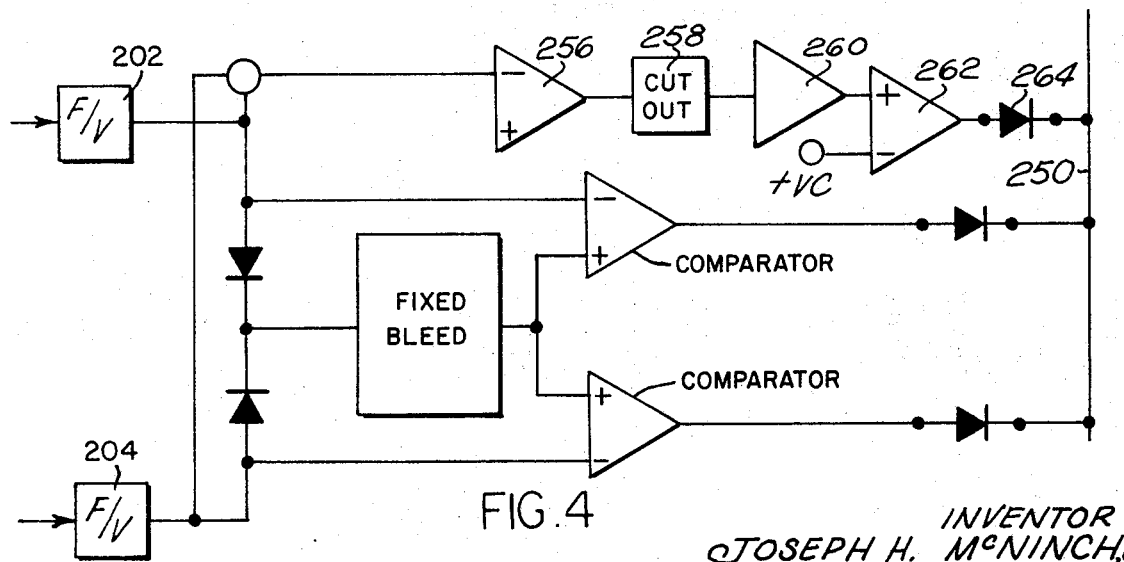
FIG. 4 is a schematic amplifier circuit for the slave module of FIG. 2.

FIG. 4 is a schematic amplifier diagram similar to the diagram of FIG. 3 and which may be used for the slave module 200. Several aspects of the slave circuit are similar both in function and construction to the master module amplifier circuit so that only that portion of the circuit which materially differs will be discussed.

The axle deceleration logic circuit 206 is embodied in FIG. 4 and includes a summing amplifier 256. The summed signals are directed to a low speed cut-out 258 and, if greater than the set value of the cut-out, enter a differentiator 260 which differentiates the speed signals with respect to time to produce in axle deceleration signal. This deceleration signal is applied to the comparator amplifier 262 for comparison with a reference signal VC. If the output of the comparator amplifier 262 is a negative voltage, it is blocked by the blocking diode 264 but if positive, a skid control signal is applied to the output line 250.

While the invention has been described with particu-

LOGIC INTEGRITY

| Excess brake application | Deceleration logic | Speed logic | Computed speed logic |
|---|---|---|---|
| Very small | A wheel can slowly decelerate to lock-up without producing a signal. | Good signal. | No signal unless high rate of deceleration takes place. |
| Small | Early indication of impending lock-up gives smooth stop without lock-up. | Late indication of impending lock-up leads to momentary lock. | No signal unless high rate of deceleration takes place. With low vehicle deceleration, wheel references to high vehicle deceleration resulting in step-lock |
| Medium | Loss of signal during wheel roll-up causes premature reapplication resulting in step-lock. | Brakes are not reapplied until wheel has rolled up to optimum speed. Maintains signal even during momentary lock-up. | Brakes are not reapplied until wheel has rolled up to computed speed which is less than optimum, resulting in step-lock. |
| Heavy | Excess brake application locks wheels before the excess air can be exhausted from the chambers. When the wheels lock, deceleration is zero and the signal disappears. | The excess application locks the wheels before the excess air can be exhausted. The speed reference will be to locking wheels causing stop lock or all wheels may reach zero simultaneously resulting in loss of signal. | In the event of no other signal, the computed vehicle speed logic will release the brakes at least two cycles and in so doing, one or more of the other logics will become effective and the system will regain true vehicle reference. |
| Unloaded full treadle on ice. | Excess brake application locks wheels before the excess air can be exhausted from the chambers. When the wheels lock, deceleration is zero and the signal disappears. | The excess application locks the wheels before the excess air can be exhausted. All wheels will reach zero simultaneously resulting in loss of signal. | In the event of no other signal, the computed vehicle speed logic will release the brakes at least two cycles and in so doing, one or more of the other logics will become effective and the system may regain true vehicle reference. |

Thus, the compound logic system 19 provides a skid control system that (1) detects impending wheel lock lar reference to specific embodiments, neither the illustrated embodiments nor the terminology employed in describing them is intended to be limiting; rather, it is intended to be limited only by the scope of the appended claims.

What is claimed is:

1. A brake control system for a vehicle having a plurality of brake equipped independently rotatable wheels and including at least a pair of wheels mounted in spaced relation for rotation about a common axis, said system comprising
   means for applying brake forces to actuate said brakes and for relieving said brake forces at both of said wheels on said common axis in response to a skid signal,
   signal generating means associated with each of said wheels to generate signals representative of the speed of each wheel,
   first logic means operative to generate a skid signal when a wheel speed signal from said pair of wheels differs by a predetermined amount from the wheel speed signal of the fastest rotating wheel,
   second logic means operative to generate a skid signal when the deceleration of a wheel on said common axis exceeds a predetermined deceleration,
   means for generating a computed reference speed signal which decreases in magnitude as the speed of the faster wheel decreases for an initial value representative of the speed of the faster wheel and at a decay rate representative of a predetermined deceleration,
   third logic means operative to generate a skid signal when a wheel speed signal from said pair of wheels decreases below said computed reference speed signal, and
   circuit means interconnecting each of said logic means whereby a skid signal generated by any of said logic means is operative to actuate said brake relieving means to relieve the brake forces at both of said wheels on said common axis.

2. The system of claim 1 wherein said first and third logic means comprise circuit means for receiving said fastest wheel speed signal and producing a first output signal that is proportional to said fastest rotating wheel speed signal when said fastest wheel speed is decreasing at a rate equal to or less than a predetermined rate and a second output signal representative of a computed speed signal when said fastest wheel speed is decreasing at a rate in excess of a predetermined rate;
   said circuit means further including comparator means for comparing said first output signal with a wheel speed signal from said pair of wheels.

3. The system of claim 2 wherein said comparator means is operative to compare the wheel speed signal from either of said pair of wheels with said first output signal.

4. A skid control system for a vehicle having a pair of brake equipped independently rotatable wheels mounted in spaced relation for rotation about a common axis, said system comprising,
   generating means for producing signals representative of the wheel speed of each of said wheels,
   vehicle operator controlled means for applying forces to the brakes,
   means operative to relieve the application of forces to said brakes associated with both of said wheels in response to a skid signal,
   logic system means for detecting a skid condition at least at one of the wheels and generating a skid signal, said system including circuit means for receiving the wheels speed signal from the fastest rotating wheel and producing a first output signal proportional to said fastest rotating wheel speed signal and further including means for producing a second output signal representative of a computed speed signal when said fastest rotating wheel speed signal is decreasing at a rate in excess of a predetermined rate,
   said system further including comparator means for comparing said first output signal with a speed signal from said wheels and being operative to generate a skid signal when said speed signal from said wheels is less than said first output signal.

5. The system of claim 4 wherein said comparator means is operative to compare the wheel speed signal from either of said pair of wheels with said first output signal.

6. The system of claim 4 wherein said logic system further includes means operative to generate a skid signal when the deceleration of a wheel on said common axis exceeds a predetermined deceleration.

* * * * *